US010023823B2

(12) United States Patent
Takahashi et al.

(10) Patent No.: US 10,023,823 B2
(45) Date of Patent: Jul. 17, 2018

(54) REFRIGERATOR OIL AND WORKING FLUID COMPOSITION FOR REFRIGERATOR

(71) Applicant: JXTG NIPPON OIL & ENERGY CORPORATION, Tokyo (JP)

(72) Inventors: Hitoshi Takahashi, Tokyo (JP); Hiroko Shimpo, Tokyo (JP); Souichirou Konno, Tokyo (JP); Ken Sawada, Tokyo (JP); Kentaro Yamaguchi, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 15/516,150

(22) PCT Filed: Sep. 24, 2015

(86) PCT No.: PCT/JP2015/076946
§ 371 (c)(1),
(2) Date: Mar. 31, 2017

(87) PCT Pub. No.: WO2016/056392
PCT Pub. Date: Apr. 14, 2016

(65) Prior Publication Data
US 2017/0327759 A1 Nov. 16, 2017

(30) Foreign Application Priority Data

Oct. 9, 2014 (JP) .................................. 2014-207798

(51) Int. Cl.
*C09K 5/04* (2006.01)
*C10M 105/40* (2006.01)

(52) U.S. Cl.
CPC ........... *C10M 105/40* (2013.01); *C09K 5/045* (2013.01); *C09K 2205/122* (2013.01); *C09K 2205/126* (2013.01); *C09K 2205/22* (2013.01); *C10M 2207/2835* (2013.01); *C10N 2240/30* (2013.01)

(58) Field of Classification Search
CPC ........... C10M 171/008; C10N 2030/00; C10N 2030/06; C10N 2040/30; C09K 5/045; C09K 5/04
USPC .......................................................... 252/68
See application file for complete search history.

(56) References Cited

U.S. PATENT DOCUMENTS

| 9,365,760 | B2 * | 6/2016 | Saito ................... C10M 169/04 |
| 9,546,337 | B2 * | 1/2017 | Saito ........................ C09K 5/04 |
| 2010/0122545 | A1 | 5/2010 | Minor et al. |
| 2011/0219815 | A1 | 9/2011 | Yana Motta et al. |
| 2012/0132848 | A1 * | 5/2012 | Sawada ................. C09K 5/045 252/68 |
| 2013/0096218 | A1 * | 4/2013 | Rached .................. C09K 5/045 521/170 |
| 2015/0041705 | A1 * | 2/2015 | Saito ..................... C09K 5/045 252/68 |
| 2015/0076393 | A1 | 3/2015 | Saito et al. |
| 2017/0015935 | A1 * | 1/2017 | Takahashi .......... C10M 171/008 |
| 2017/0044461 | A1 * | 2/2017 | Takahashi ............ C10M 105/08 |
| 2017/0218292 | A1 * | 8/2017 | Konno .................... C10L 5/442 |
| 2017/0240834 | A1 * | 8/2017 | Takahashi ............ C10M 105/38 |

FOREIGN PATENT DOCUMENTS

| JP | 2012-509390 | 4/2012 |
| JP | 2012-526182 | 10/2012 |
| JP | 2013-529703 | 7/2013 |
| TW | 201343902 A | 11/2013 |
| WO | 2010/059677 A2 | 5/2010 |
| WO | 2010/129920 A1 | 11/2010 |
| WO | 2011/163117 A1 | 12/2011 |
| WO | 2013/009488 A2 | 1/2013 |
| WO | 2013/147048 A1 | 10/2013 |

OTHER PUBLICATIONS

International Preliminary Report on Patentability in respect to International Application No. PCT/JP2015/076946, dated Apr. 20, 2017.
Search Report issued in Patent Application No. PCT/JP2015/076946, dated Oct. 27, 2015.
Office Action issued in Taiwan Counterpart Patent Appl. No. 104132727, dated Mar. 30, 2016.

* cited by examiner

*Primary Examiner* — Douglas J McGinty
(74) *Attorney, Agent, or Firm* — Greenblum & Bernstein, P.L.C.

(57) ABSTRACT

The present invention provides a refrigerating machine oil comprising, as a base oil, at least one oxygen-containing oil having a carbon/oxygen molar ratio of 2.5 or more and 5.8 or less, wherein the refrigerating machine oil is used with a refrigerant comprising 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant.

9 Claims, No Drawings

REFRIGERATOR OIL AND WORKING FLUID COMPOSITION FOR REFRIGERATOR

TECHNICAL FIELD

The present invention relates to a refrigerating machine oil, a working fluid composition for a refrigerating machine, use of a composition for a refrigerating machine oil or a working fluid composition for a refrigerating machine, and use of a composition for manufacturing a refrigerating machine oil or a working fluid composition for a refrigerating machine.

BACKGROUND ART

CFC (chlorofluorocarbon) and HCFC (hydrochlorofluorocarbon), which have been conventionally used as refrigerants for refrigeration equipment, have been subject to regulation due to the problem of recent ozone layer depletion, and HFCs (hydrofluorocarbons) such as 1,1,1,2-tetrafluoroethane (HFC-134a) and pentafluoroethane (HFC-125) have been increasingly used as refrigerants instead of them. Among HFC refrigerants, however, for example, R134a normally used as a refrigerant for a car air-conditioner is subject to regulation in Europe because the global warming potential (GWP) is high while the ozone layer depletion potential (ODP) is zero. Hydrofluoroolefins (HFOs) such as 1,3,3,3-tetrafluoropropene (HFO-1234ze) and 2,3,3,3-tetrafluoropropene (HFO-1234yf), and a low-GWP refrigerant such as difluoromethane (HFC-32) have attracted attention. In addition, for example, Patent Literature 1 discloses a mixed refrigerant including a HFC refrigerant and a FIFO refrigerant.

Meanwhile, while a refrigerating machine oil comprising hydrocarbon oil such as mineral oil or alkylbenzene has been suitably used in the case of use of conventional CFC or HCFC as a refrigerant, the refrigerating machine oil exhibits, depending on the type of a coexisting refrigerant, unpredictable behaviors with respect to compatibility with the refrigerant, lubricity, dissolution viscosity in the refrigerant, thermal/chemical stability and the like, and therefore a refrigerating machine oil with respect to each refrigerant is required to be developed.

CITATION LIST

Patent Literature

Patent Literature 1: International Publication WO 2013/009488

SUMMARY OF INVENTION

Technical Problem

An object of the present invention is to provide a refrigerating machine oil excellent in suitability with a refrigerant containing predetermined amounts of difluoromethane, pentafluoroethane, 2,3,3,3-tetrafluoropropene and 1,1,1,2-tetrafluoroethane, and a working fluid composition for a refrigerating machine, comprising the refrigerating machine oil.

Solution to Problem

The present invention provides a refrigerating machine oil comprising, as a base oil, at least one oxygen-containing oil having a carbon/oxygen molar ratio of 2.5 or more and 5.8 or less, wherein the refrigerating machine oil is used with a refrigerant containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant.

It is preferable that the refrigerating machine oil contain, as the oxygen-containing oil, an ester of a fatty acid and a polyhydric alcohol, wherein a ratio of a fatty acid having 4 to 20 carbon atoms in the fatty acid is 20 to 100% by mole.

The present invention also provides a working fluid composition for a refrigerating machine, comprising the refrigerating machine oil, and a refrigerant containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant.

The present invention also provides use of a composition for a refrigerating machine oil or a working fluid composition for a refrigerating machine, wherein the composition comprises, as a base oil, at least one oxygen-containing oil having a carbon/oxygen molar ratio of 2.5 or more and 5.8 or less, the refrigerating machine oil is used with a refrigerant containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant, and the working fluid composition for a refrigerating machine comprises the refrigerating machine oil, and a refrigerant containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant.

The present invention also provides use of a composition for manufacturing a refrigerating machine oil or a working fluid composition for a refrigerating machine, wherein the composition comprises, as a base oil, at least one oxygen-containing oil having a carbon/oxygen molar ratio of 2.5 or more and 5.8 or less, the refrigerating machine oil is used with a refrigerant containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant, and the working fluid composition for a refrigerating machine comprises the refrigerating machine oil, and a refrigerant containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant.

Advantageous Effects of the Invention

According to the present invention, it is possible to provide a refrigerating machine oil excellent in suitability with a refrigerant containing predetermined amounts of difluoromethane, pentafluoroethane, 2,3,3,3-tetrafluoropropene and 1,1,1,2-tetrafluoroethane, and a working fluid composition for a refrigerating machine, comprising the refrigerating machine oil.

DESCRIPTION OF EMBODIMENTS

Hereinafter, an embodiment of the present invention are described in detail.

A refrigerating machine oil according to the present embodiment comprises, as a base oil, at least one oxygen-containing oil having a carbon/oxygen molar ratio of 2.5 or more and 5.8 or less, and is used with a refrigerant (hereinafter, also referred to as "refrigerant according to the present embodiment".) containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant.

In addition, a working fluid composition for a refrigerating machine according to the present embodiment comprises a refrigerating machine oil comprising, as a base oil, at least one oxygen-containing oil having a carbon/oxygen molar ratio of 2.5 or more and 5.8 or less, and a refrigerant containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant. Herein, the working fluid composition for a refrigerating machine according to the present embodiment encompasses an aspect of a working fluid composition for a refrigerating machine, comprising the refrigerating machine oil according to the present embodiment, and a refrigerant containing 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on the total amount of the refrigerant.

The base oil according to the present embodiment is at least one oxygen-containing oil having a carbon/oxygen molar ratio of 2.5 or more and 5.8 or less. The carbon/oxygen molar ratio of such an oxygen-containing oil is preferably 3.2 or more and 5.0 or less, more preferably 4.0 or more and 5.0 or less, from the viewpoints of compatibility with the refrigerant, and stability. The carbon/oxygen molar ratio may be 2.5 or more and 5.0 or less, 3.2 or more and 5.8 or less, or 4.0 or more and 5.8 or less from the same viewpoints. The carbon/oxygen molar ratio is preferably 2.5 or more, more preferably 3.2 or more, further preferably 4.0 or more, and is preferably 5.8 or less, more preferably 5.0 or less. Herein, the carbon/oxygen molar ratio can be quantitatively determined by a common elemental analysis method. Examples of a method of analyzing carbon include an analysis method by a thermal conductivity method after conversion into carbon dioxide by burning, or a gas chromatography method. A method of analyzing oxygen is commonly a carbon reduction method where the oxygen is converted to carbon monoxide with carbon and thereafter subjected to a quantitative analysis, and a Shutze-Unterzaucher method is widely practically used.

Examples of the oxygen-containing oil include esters, polyvinyl ethers, polyalkylene glycols, carbonates, ketones, polyphenylethers, silicones, polysiloxanes and perfluoroethers, esters, polyvinyl ethers and polyalkylene glycols are preferable, and esters are more preferable.

Examples of the esters include aromatic esters, dibasic acid esters, polyol esters, complex esters, carbonic acid esters, and mixtures thereof, and polyol esters are preferable.

For aromatic esters, an ester of an aromatic mono- to hexa-carboxylic, preferably mono- to tetra-carboxylic, more preferably mono- to tri-carboxylic acid, with an aliphatic alcohol having 1 to 18 carbon atoms, preferably 1 to 12 carbon atoms, or the like is used. Specific examples of the aromatic mono- to hexa-carboxylic acid include benzoic acid, phthalic acid, isophthalic acid, terephthalic acid, acid, pyromellitic acid, and mixtures thereof. Specific examples of the aliphatic alcohol having 1 to 18 carbon atoms include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, and mixtures thereof. Such aliphatic alcohols having 1 to 18 carbon atoms may be linear or branched. The aromatic di- or higher carboxylic acid may be a simple ester constituted from an alcohol including one aliphatic alcohol, or a complex ester constituted from an alcohol including two or more aliphatic alcohols.

For dibasic acid esters, an ester of a dibasic acid having 5 to 10 carbon atoms, such as glutaric acid, adipic acid, pimelic acid, suberic acid, azelaic acid or sebacic acid, with a monohydric alcohol having 1 to 15 carbon atoms and having a linear or branched alkyl group, such as methanol, ethanol, propanol, butanol, pentanol, hexanol, heptanol, octanol, nonanol, decanol, undecanol, dodecanol, tridecanol, tetradecanol or pentadecanol, and a mixture thereof are preferably used.

A polyol ester is an ester synthesized from a polyhydric alcohol and a fatty acid. As the fatty acid, a saturated fatty acid is preferably used. The number of carbon atoms in the fatty acid is preferably 4 to 20, more preferably 4 to 18, further preferably 4 to 9, particularly preferably 5 to 9. The number of carbon atoms in the fatty acid may be 5 to 20 or 5 to 18. The number of carbon atoms in the fatty acid may be 4 or more, or 5 or more, and may be 20 or less, 18 or less, or 9 or less. Such a polyol ester may be a partial ester where a hydroxyl group of the polyhydric alcohol is not partially esterified and remains as a hydroxyl group, may be a complete ester where a hydroxyl group is fully esterified, or may be a mixture of the partial ester and the complete ester. The hydroxyl value of the polyol ester is preferably 10 mgKOH/g or less, more preferably 5 mgKOH/g or less, further preferably 3 mgKOH/g or less.

The ratio of a fatty acid having 4 to 20 carbon atoms in the fatty acid constituting the polyol ester is preferably 20 to 100% by mole, more preferably 50 to 100% by mole, further preferably 70 to 100% by mole, particularly preferably 90 to 100% by mole.

Examples of the fatty acid having 4 to 20 carbon atoms include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid and icosanoic acid. These fatty acids having 4 to 20 carbon atoms may be linear or branched. More specifically, a fatty acid branched at the α-position and/or β-position is preferable, 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, 2-ethylhexadecanoic acid, and the like are more preferable, and in particular, 2-ethylhexanoic acid and 3,5,5-trimethylhexanoic acid are further preferable.

The fatty acid may also include any fatty acid other than the fatty acid having 4 to 20 carbon atoms. Examples of such a fatty acid other than the fatty acid having 4 to 20 carbon atoms include fatty acids having 21 to 24 carbon atoms, and specifically include linear or branched heneicosanoic acid, linear or branched docosanoic acid, linear or branched tricosanoic acid, and linear or branched tetracosanoic acid.

As the polyhydric alcohol constituting the polyol ester, a polyhydric alcohol having 2 to 6 hydroxyl groups is preferably used. The number of carbon atoms in the polyhydric alcohol is preferably 4 to 12, more preferably 5 to 10.

Specifically, hindered alcohols such as neopentyl glycol, trimethylolethane, trimethylolpropane, trimethylolbutane, di-(trimethylolpropane), tri-(trimethylolpropane), pentaerythritol and dipentaerythritol are preferable. More preferable is pentaerythritol, or a mixed ester of pentaerythritol and dipentaerythritol because of being particularly excellent in compatibility with the refrigerant, and hydrolysis stability.

In addition, a complex ester is an ester of a fatty acid and a dibasic acid, with a monohydric alcohol and a polyol. As the fatty acid, the dibasic acid, the monohydric alcohol and the polyol, those which are the same as those recited in the description about the dibasic acid ester and the polyol ester can be used.

A carbonic acid ester is a compound having a carbonic acid ester structure represented by the following formula (A) in its molecule. Such a carbonic acid ester may have one or more carbonic acid ester structures in one molecule.

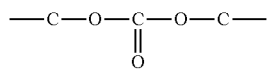
(A)

As the alcohol constituting the carbonic acid ester, the above aliphatic alcohol, the above polyol, and the like can be used, and a polyglycol, or a polyglycol added to the polyol can also be used. The carbonic acid ester may be constituted from carbonic acid, and a fatty acid and/or a dibasic acid.

As the carbonic acid ester, in particular, a carbonic acid ester having a structure represented by the following formula (A-1) is preferable.

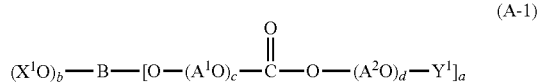
(A-1)

[In the above formula (A-1), $X^1$ represents a hydrogen atom, an alkyl group, a cycloalkyl group, or a group represented by the following formula (A-2):

(A-2)

(in the above formula (A-2), $Y^2$ represents a hydrogen atom, an alkyl group or a cycloalkyl group, $A^3$ represents an alkylene group having 2 to 4 carbon atoms, and e represents an integer of 1 to 50), $A^1$ and $A^2$ may be identical or different, and each represent an alkylene group having 2 to 4 carbon atoms, $Y^1$ represents a hydrogen atom, an alkyl group or a cycloalkyl group, B represents a residue of a compound having 3 to 20 hydroxyl groups, a represents an integer of 1 to 20 and b represents an integer of 0 to 19, provided that a+b=3 to 20 is satisfied, c represents an integer of 0 to 50, and d represents an integer of 1 to 50]

In the above formula (A-1), $X^1$ represents a hydrogen atom, an alkyl group, a cycloalkyl group or a group represented by the above formula (A-2). The number of carbon atoms in the alkyl group is not particularly limited, but is usually 1 to 24, preferably 1 to 18, more preferably 1 to 12. The alkyl group may be linear or branched.

Specific examples of the alkyl group having 1 to 24 carbon atoms include a methyl group, an ethyl group, a n-propyl group, an isopropyl group, a n-butyl group, an isobutyl group, a sec-butyl group, a tert-butyl group, a linear or branched pentyl group, a linear or branched hexyl group, a linear or branched heptyl group, a linear or branched octyl group, a linear or branched nonyl group, a linear or branched decyl group, a linear or branched undecyl group, a linear or branched dodecyl group, a linear or branched tridecyl group, a linear or branched tetradecyl group, a linear or branched pentadecyl group, a linear or branched hexadecyl group, a linear or branched heptadecyl group, a linear or branched octadecyl group, a linear or branched nonadecyl group, a linear or branched icosyl group, a linear or branched henicosyl group, a linear or branched docosyl group, a linear or branched tricosyl group and a linear or branched tetracosyl group.

Specific examples of the cycloalkyl group include a cyclopentyl group, a cyclohexyl group and a cycloheptyl group.

In the above formula (A-2), examples of the alkylene group having 2 to 4 carbon atoms represented by $A^3$ include an ethylene group, a propylene group, a trimethylene group, a butylene group, a tetramethylene group, a 1-methyltrimethylene group, a 2-methyltrimethylene group, a 1,1-dimethylethylene group and a 1,2-dimethylethylene group.

$Y^2$ in the above formula (A-2) represents a hydrogen atom, an alkyl group or a cycloalkylkyl group. The number of carbon atoms in the alkyl group is not particularly limited, but is usually 1 to 24, preferably 1 to 18, more preferably 1 to 12. The alkyl group may be linear or branched. Specific examples of the alkyl group having 1 to 24 carbon atoms include those recited in the description about $X^1$.

Specific examples of the cycloalkyl group include a cyclopentyl group, a cyclohexyl group and a cycloheptyl group.

Among them, $Y^2$ preferably represents a hydrogen atom or an alkyl group having 1 to 12 carbon atoms, more preferably any of a hydrogen atom, a methyl group, an ethyl group, a n-propyl group, an iso-propyl group, a n-butyl group, an iso-butyl group, a sec-butyl group, a tert-butyl group, a n-pentyl group, an iso-pentyl group, a neo-pentyl group, a n-hexyl group, an iso-hexyl group, a n-heptyl group, an iso-heptyl group, a n-octyl group, an iso-octyl group, a n-nonyl group, an iso-nonyl group, a n-decyl group, an iso-decyl group, a n-undecyl group, an iso-undecyl group, a n-dodecyl group or an iso-dodecyl group.

$X^1$ preferably represents a hydrogen atom, an alkyl group having 1 to 12 carbon atoms, or a group represented by the formula (A-2), more preferably a hydrogen atom, a methyl group, an ethyl group, a n-propyl group, an iso-propyl group, a n-butyl group, an iso-butyl group, a sec-butyl group, a tea-butyl group, a n-pentyl group, an iso-pentyl group, a neo-pentyl group, a n-hexyl group, an iso-hexyl group, a n-heptyl group, an iso-heptyl group, a n-octyl group, an iso-octyl group, a n-nonyl group, an iso-nonyl group, a n-decyl group, an iso-decyl group, a n-undecyl group, an iso-undecyl group, a n-dodecyl group, an iso-dodecyl group, or a group represented by the formula (A-2).

Specific examples of the compound where the residue is B, having 3 to 20 hydroxyl groups, include the above polyol.

$A^1$ and $A^2$ may be identical or different, and each represent an alkylene group having 2 to 4 carbon atoms. Specific examples include an ethylene group, a propylene group, a trimethylene group, a butylene group, a tetramethylene group, a 1-methyltrimethylene group, a 2-methyltrimethylene group, a 1,1-dimethylethylene group and a 1,2-dimethylethylene group.

$Y^1$ represents a hydrogen atom, an alkyl group or a cycloalkylkyl group. The number of carbon atoms in the alkyl group is not particularly limited, but is usually 1 to 24, preferably 1 to 18, more preferably 1 to 12. The alkyl group may be linear or branched. Specific examples of the alkyl group having 1 to 24 carbon atoms include those recited in the description about $X^1$.

Specific examples of the cycloalkyl group include a cyclopentyl group, a cyclohexyl group and a cycloheptyl group.

Among them, $Y^1$ preferably represents a hydrogen atom or an alkyl group having 1 to 12 carbon atoms, more preferably a hydrogen atom, a methyl group, an ethyl group, a n-propyl group, an iso-propyl group, a n-butyl group, an iso-butyl group, a sec-butyl group, a tert-butyl group, a n-pentyl group, an iso-pentyl group, a neo-pentyl group, a n-hexyl group, an iso-hexyl group, a n-heptyl group, an iso-heptyl group, a n-octyl group, an iso-octyl group, a n-nonyl group, an iso-nonyl group, a n-decyl group, an iso-decyl group, a n-undecyl group, an iso-undecyl group, a n-dodecyl group or an iso-dodecyl group.

In the above formulae (A-1) and (A-2), c, d and e each represent the degree of polymerization of polyoxyalkylene moieties. Such polyoxyalkylene moieties may be identical or different in the molecule. In the case where the carbonic acid ester has a plurality of different polyoxyalkylene moieties, the polymerization form of the oxyalkylene group is not particularly limited, and may be random copolymerization or block copolymerization.

Each polyvinyl ether has a structural unit represented by the following formula (1).

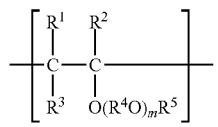

(1)

[In the formula, $R^1$, $R^2$ and $R^3$ may be identical or different from each other, and each represent a hydrogen atom or a hydrocarbon group, $R^4$ represents a divalent hydrocarbon group or a divalent ether bond oxygen-containing hydrocarbon group, $R^5$ represents a hydrocarbon group, and m represents an integer of 0 or more. In the case where m represents 2 or more, a plurality of $R^4$ may be identical or different from each other.]

The number of carbon atoms in the hydrocarbon group represented by any of $R^1$, $R^2$ and $R^3$ in the formula (1) is preferably 1 to 8, more preferably 2 to 7, further preferably 3 to 6. In addition, it is preferable that at least one of $R^1$, $R^2$ and $R^3$ in the formula (1) represent a hydrogen atom, and it is more preferable that all of them represent a hydrogen atom.

The number of carbon atoms in the divalent hydrocarbon group and the ether bond oxygen-containing hydrocarbon group represented by $R^4$ in the formula (1) is preferably 1 to 10, more preferably 2 to 8, further preferably 3 to 6. In addition, the divalent ether bond oxygen-containing hydrocarbon group represented by $R^4$ in the formula (1) may be, for example, a hydrocarbon group having, in a side chain, oxygen forming an ether bond.

It is preferable that $R^5$ in the formula (1) represent a hydrocarbon group having 1 to 20 carbon atoms. Examples of the hydrocarbon group include an alkyl group, a cycloalkyl group, a phenyl group, an aryl group and an arylalkyl group. Among them, an alkyl group is preferable, and an alkyl group having 1 to 5 carbon atoms is more preferable.

In the formula (1), m preferably represents 0 to 20, more preferably 1 to 18, further preferably 2 to 16. In addition, it is preferable that the average value of m in all the structural units constituting the polyvinyl ether be 0 to 10.

The polyvinyl ether may be a homopolymer constituted by one kind selected from the structural unit represented by the formula (1), may be a copolymer constituted by two or more kinds selected from the structural unit represented by the formula (1), or may be a copolymer constituted by the structural unit represented by the formula (1) and other structural unit. The polyvinyl ether can be a copolymer, to thereby result in further enhancement in lubricity, insulation properties, hygroscopic properties, and the like while compatibility of the refrigerating machine oil with the refrigerant is satisfied. Here, the types of monomers serving as raw materials, the type of an initiator, the ratio of structural units in the copolymer, and the like can be appropriately selected to thereby allow various characteristics of the refrigerating machine oil to be desired characteristics. Accordingly, any refrigerating machine oil can be obtained depending on different requirements, such as lubricity and compatibility, due to the model of a compressor in a refrigerating system or an air-conditioning system, the material of a lubricating portion, the refrigerating ability, and the type of the refrigerant. The copolymer may be either a block copolymer or a random copolymer.

In the case where the polyvinyl ether is a copolymer, it is preferable that the copolymer include a structural unit (1-1) represented by the above formula (1), wherein $R^5$ represents an alkyl group having 1 to 3 carbon atoms, and a structural unit (1-2) represented by the above formula (1), wherein $R^5$ represents an alkyl group having 3 to 20 carbon atoms, preferably 3 to 10 carbon atoms, further preferably 3 to 8 carbon atoms. $R^5$ in the structural unit (1-1) particularly preferably represents an ethyl group, and $R^5$ in the structural unit (1-2) particularly preferably represents an isobutyl group. In the case where the polyvinyl ether is a copolymer including the structural units (1-1) and (1-2), the molar ratio of the structural unit (1-1) to the structural unit (1-2) is preferably 5:95 to 95:5, more preferably 20:80 to 90:10, further preferably 70:30 to 90:10. When the molar ratio is in the above range, it tends to be possible to more enhance compatibility with the refrigerant and to reduce hygroscopic properties.

The polyvinyl ether may be constituted by only the structural unit represented by the above formula (1), but may be a copolymer further including the structural unit represented by the following formula (2). In such a case, the copolymer may be either a block copolymer or a random copolymer.

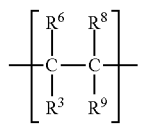

(2)

[In the formula, $R^6$ to $R^9$ may be identical or different from each other, and each represent a hydrogen atom or a hydrocarbon group having 1 to 20 carbon atoms.]

The polyvinyl ether can be produced by polymerization of a vinyl ether-based monomer corresponding to the formula (1), or copolymerization of the vinyl ether-based monomer corresponding to the formula (1) and a hydrocarbon monomer having an olefinic double bond corresponding to the formula (2). The vinyl ether-based monomer corresponding to the structural unit represented by the formula (1) is suitably a monomer represented by the following formula (3).

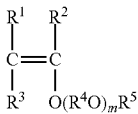
(3)

[In the formula, $R^1$, $R^2$, $R^3$, $R^4$, $R^5$ and m represent the same meanings as defined in $R^1$, $R^2$, $R^3$, $R^4$, $R^5$ and m in the formula (1), respectively.]

It is preferable that the polyvinyl ether have the following terminal structure (A) or (B).

(A) a structure where one terminal is represented by formula (4) or (5) and the other terminal is represented by formula (6) or (7).

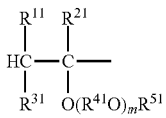
(4)

[In the formula, $R^{11}$, $R^{21}$ and $R^{31}$ may be identical or different from each other, and each represent a hydrogen atom or a hydrocarbon group having 1 to 8 carbon atoms, $R^{41}$ represents a divalent hydrocarbon group or a divalent ether bond oxygen-containing hydrocarbon group having 1 to 10 carbon atoms, $R^{51}$ represents a hydrocarbon group having 1 to 20 carbon atoms, and m represents the same meaning as defined in m in the formula (1). In the case where m represents 2 or more, a plurality of $R^{41}$ may be identical or different from each other.]

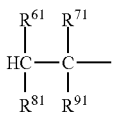
(5)

[In the formula, $R^{61}$, $R^{71}$, $R^{81}$ and $R^{91}$ may be identical or different from each other, and each represent a hydrogen atom or a hydrocarbon group having 1 to 20 carbon atoms.]

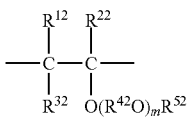
(6)

[In the formula, $R^{12}$, $R^{22}$ and $R^{32}$ may be identical or different from each other, and each represent a hydrogen atom or a hydrocarbon group having 1 to 8 carbon atoms, $R^{42}$ represents a divalent hydrocarbon group or a divalent ether bond oxygen-containing hydrocarbon group having 1 to 10 carbon atoms, $R^{52}$ represents a hydrocarbon group having 1 to 20 carbon atoms, and m represents the same meaning as defined in m in the formula (1). In the case where m represents 2 or more, a plurality of $R^{41}$ may be identical or different from each other.]

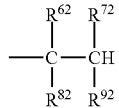
(7)

[In the formula, $R^{62}$, $R^{72}$, $R^{82}$ and $R^{92}$ may be identical or different from each other, and each represent a hydrogen atom or a hydrocarbon group having 1 to 20 carbon atoms.]

(B) a structure where one terminal is represented by the above formula (4) or (5) and the other terminal is represented by the following formula (8).

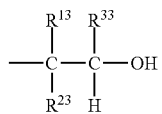
(8)

[In the formula, $R^{13}$, $R^{23}$ and $R^{33}$ may be identical or different from each other, and each represent a hydrogen atom or a hydrocarbon group having 1 to 8 carbon atoms.]

Among such polyvinyl ether-based compounds, polyvinyl ethers (a), (b), (c), (d) and (e) recited below are particularly suitable for a main component (base oil) of the refrigerating machine oil.

(a) a polyvinyl ether having a structure where one terminal is represented by the formula (4) or (5) and the other terminal is represented by the formula (6) or (7), wherein, in the formula (1), all of $R^1$, $R^2$ and $R^3$ represent a hydrogen atom, m represents an integer of 0 to 4, $R^4$ represents a divalent hydrocarbon group having 2 to 4 carbon atoms and $R^5$ represents a hydrocarbon group having 1 to 20 carbon atoms.

(b) a polyvinyl ether having a structure having only the structural unit represented by the formula (1) where one terminal is represented by the formula (4) and the other terminal is represented by the formula (6), wherein, in the formula (1), all of $R^1$, $R^2$ and $R^3$ represent a hydrogen atom, m represents an integer of 0 to 4, $R^4$ represents a divalent hydrocarbon group having 2 to 4 carbon atoms and $R^5$ represents a hydrocarbon group having 1 to 20 carbon atoms.

(c) a polyvinyl ether having a structure where one terminal is represented by the formula (4) or (5) and the other terminal is represented by the formula (8), wherein, in the formula (1), all of $R^1$, $R^2$ and $R^3$ represent a hydrogen atom, m represents an integer of 0 to 4, $R^4$ represents a divalent hydrocarbon group having 2 to 4 carbon atoms and $R^5$ represents a hydrocarbon group having 1 to 20 carbon atoms.

(d) a polyvinyl ether having a structure having only the structural unit represented by the formula (1) where one terminal is represented by the formula (5) and the other terminal is represented by the formula (8), wherein, in the formula (1), all of $R^1$, $R^2$ and $R^3$ represent a hydrogen atom, m represents an integer of 0 to 4, $R^4$ represents a divalent hydrocarbon group having 2 to 4 carbon atoms and $R^5$ represents a hydrocarbon group having 1 to 20 carbon atoms.

(e) any of (a), (b), (c) and (d) above, having a structural unit where $R^5$ in the formula (1) represents a hydrocarbon group having 1 to 3 carbon atoms and a structural unit where such $R^5$ represents a hydrocarbon group having 3 to 20 carbon atoms.

A side reaction may occur to form an unsaturated group such as an aryl group in the molecule in a production step of the polyvinyl ether, and the polyvinyl ether is preferably a polyvinyl ether low in the degree of unsaturation due to an unsaturated group or the like from the viewpoints of an enhancement in heat stability of the polyvinyl ether by itself, suppression of the occurrence of any sludge due to production of a polymerized product, and suppression of production of peroxide due to deterioration in antioxidative properties (oxidation resistance). The degree of unsaturation of the polyvinyl ether is preferably 0.04 meq/g or less, more preferably 0.03 meq/g or less, further preferably 0.02 meq/g or less. The peroxide value of the polyvinyl ether is preferably 10.0 meq/kg or less, more preferably 5.0 meq/kg or less, further preferably 1.0 meq/kg. The carbonyl value of the polyvinyl ether is preferably 100 ppm by weight or less, more preferably 50 ppm by weight or less, further preferably 20 ppm by weight or less. The hydroxyl value of the polyvinyl ether is preferably 10 mgKOH/g or less, more preferably 5 mgKOH/g or less, further preferably 3 mgKOH/g or less.

The degree of unsaturation, the peroxide value and the carbonyl value in the present invention refer to the respective values measured according to Standard Methods for Analysis of Fats and Oils prescribed by the Japan Oil Chemists' Society. That is, the degree of unsaturation in the present invention refers to the value (meq/g) obtained by reacting the Wijs solution (ICl-acetic acid solution) with a sample, leaving the resultant to stand in a dark place, thereafter reducing excess ICl to iodine, titrating the iodine content with sodium thiosulfate to calculate the iodine value, and converting the iodine value to the vinyl equivalent. The peroxide value in the present invention refers to the value (meq/kg) obtained by adding potassium iodide to a sample, titrating the resulting free iodine with sodium thiosulfate, and converting the free iodine to the milliequivalent per kg of the sample. The carbonyl value in the present invention refers to the value (ppm by weight) obtained by allowing 2,4-dinitrophenylhydrazine to act on a sample, to produce a color-developing quinoid ion, measuring the absorbance of the sample at 480 nm, and converting it to the carbonyl content based on a calibration curve determined in advance with cinnamaldehyde as the standard substance. The hydroxyl value in the present invention means the hydroxyl value measured according to JIS K0070:1992.

The polyalkylene glycol may have any of various chemical structures, and examples include polyethylene glycol, polypropylene glycol and polybutylene glycol as basic compounds. The unit structure of the polyalkylene glycol is oxyethylene, oxypropylene or oxybutylene. A polyalkylene glycol having such a unit structure can be obtained by ring-opening polymerization with, as a raw material, ethylene oxide, propylene oxide or butylene oxide being a monomer.

Examples of the polyalkylene glycol include a compound represented by the following formula (9).

$$R^\alpha\text{---}[(OR^\beta)_f\text{---}OR^\gamma]_g \quad (9)$$

[In the formula (9), $R^\alpha$ represents a hydrogen atom, an alkyl group having 1 to 10 carbon atoms, an acyl group having 2 to 10 carbon atoms, or a residue of a compound having 2 to 8 hydroxyl groups, $R^\beta$ represents an alkylene group having 2 to 4 carbon atoms, $R^\gamma$ represents a hydrogen atom, an alkyl group having 1 to 10 carbon atoms or an acyl group having 2 to 10 carbon atoms, f represents an integer of 1 to 80, and g represents an integer of 1 to 8.]

The alkyl group represented by each of $R^\alpha$ and $R^\gamma$ in the above formula (9) may be any of linear, branched or cyclic groups. The number of carbon atoms in the alkyl group is preferably 1 to 10, more preferably 1 to 6. If the number of carbon atoms in the alkyl group is more than 10, compatibility with the refrigerant tends to be deteriorated.

The alkyl group moiety of the acyl group represented by each of $R^\alpha$ and $R^\gamma$ may be any of linear, branched or cyclic groups. The number of carbon atoms in the acyl group is preferably 2 to 10, more preferably 2 to 6. If the number of carbon atoms in the acyl group is more than 10, compatibility with the refrigerant tends to be deteriorated to cause phase separation.

In the case where both the respective groups represented by $R^\alpha$ and $R^\gamma$ are alkyl groups or acyl groups, the groups represented by $R^\alpha$ and $R^\gamma$ may be identical or different. In the case where g represents 2 or more, the groups represented by a plurality of $R^\alpha$ and $R^\gamma$ in the same molecule may be identical or different.

In the case where the group represented by $R^\alpha$ is a residue of a compound having 2 to 8 hydroxyl groups, the compound may be straight-chain or cyclic.

In the polyalkylene glycol represented by the above formula (9), at least one of $R^\alpha$ and $R^\gamma$ preferably represents an alkyl group (more preferably an alkyl group having 1 to 4 carbon atoms), particularly preferably represents a methyl group, in terms of compatibility with the refrigerant.

Both $R^\alpha$ and $R^\gamma$ preferably represent an alkyl group (more preferably an alkyl group having 1 to 4 carbon atoms), more preferably represent a methyl group, in terms of thermal/chemical stability.

Preferably, any one of $R^\alpha$ or $R^\gamma$ represents an alkyl group (more preferably an alkyl group having 1 to 4 carbon atoms) and the other thereof represents a hydrogen atom, and more preferably, one represents a methyl group and the other represents a hydrogen atom, in terms of production easiness and cost. It is preferable in terms of lubricity and sludge solubility that both $R^\alpha$ and $R^\gamma$ represent a hydrogen atom.

$R^\beta$ in the above formula (9) represents an alkylene group having 2 to 4 carbon atoms, and specific examples of such an alkylene group include an ethylene group, a propylene group and a butylene group. In addition, examples of each oxyalkylene group as a repeating unit represented by $OR^\beta$ include an oxyethylene group, an oxypropylene group and an oxybutylene group. Such an oxyalkylene group may be constituted from one kind of an oxyalkylene group or two or more kinds of oxyalkylene groups in the same molecule.

A copolymer including an oxyethylene group (EO) and an oxypropylene group (PO) is preferable as the polyalkylene glycol represented by the above formula (9) from the viewpoints of compatibility with the refrigerant and viscosity-temperature characteristics, and in such a case, the ratio (EO/(PO+EU)) of the oxyethylene group in the total of the oxyethylene group and the oxypropylene group is preferably in the range from 0.1 to 0.8, more preferably the range from 0.3 to 0.6, in terms of seizure load and viscosity-temperature characteristics.

The value of EO/(PO+EO) is preferably in the range from 0 to 0.5, more preferably in the range from 0 to 0.2, most preferably 0 (namely, propylene oxide homopolymer), in terms of hygroscopic properties and heat/oxidation stability.

In the above formula (9), f represents the number of repeating oxyalkylene groups $OR^\beta$ (the degree of polymerization), and an integer of 1 to 80. g represents an integer of 1 to 8. For example, in the case where $R^{\alpha}$ represents an alkyl group or an acyl group, g represents 1. In the case where $R^{\alpha}$ represents a residue of a compound having 2 to 8 hydroxyl groups, g represents the number of hydroxyl groups in the compound.

The product (f×g) of f and g is not particularly limited, but it is preferable that the average value of f×g be 6 to 80 in order to satisfy the above requirement performances as the refrigerating machine oil in a well-balanced manner.

In the polyalkylene glycol represented by the formula (9), the number average molecular weight is preferably 500 to 3000, further preferably 600 to 2000, more preferably 600 to 1500, and n preferably represents a number so that the number average molecular weight of the polyalkylene glycol satisfies the above conditions. In the case where the number average molecular weight of the polyalkylene glycol is too low, lubricity is insufficient under the coexistence with the refrigerant. On the other hand, in the case where the number average molecular weight is too high, the composition range where compatibility is exhibited to the refrigerant under a low temperature condition is narrow, and poor lubrication in a refrigeration compressor and inhibition of heat exchange in an evaporator are easily caused.

The hydroxyl value of the polyalkylene glycol is not particularly limited, but is preferably 100 mgKOH/g or less, more preferably 50 mgKOH/g or less, further preferably 30 mgKOH/g or less, most preferably 10 mgKOH/g or less.

The polyalkylene glycol can be synthesized by using a known method ("Alkylene Oxide Polymer", Mitsuta Shibata et al., published by Kaibundo Publishing Co., Ltd., issued on Nov. 20, 1990). For example, one or more kinds of predetermined alkylene oxides are addition polymerized with an alcohol ($R^{\alpha}OH$; $R^{\alpha}$ represents the same meaning as defined in $R^{\alpha}$ in the above formula (9)), and furthermore a terminal hydroxyl group is etherified or esterified to thereby obtain the polyalkylene glycol represented by the above formula (9). In the case where two or more kinds of alkylene oxides are used in the above production step, the resulting polyalkylene glycol may be any of a random copolymer and a block copolymer, but is preferably a block copolymer because of being more excellent in oxidation stability and lubricity, and is preferably a random copolymer because of being more excellent in low-temperature fluidity.

The kinematic viscosity at 100° C. of the polyalkylene glycol is preferably 5 to 20 mm$^2$/s, preferably 6 to 18 mm$^2$/s, more preferably 7 to 16 mm$^2$/s, further preferably 8 to 15 mm$^2$/s, most preferably 10 to 15 mm$^2$/s. If the kinematic viscosity at 100° C. is less than the lower limit, lubricity is insufficient under the coexistence with the refrigerant, and on the other hand, if the kinematic viscosity at 100° C. is more than the upper limit, the composition range where compatibility is exhibited to the refrigerant is narrow, and poor lubrication in a refrigeration compressor and inhibition of heat exchange in an evaporator are easily caused. In addition, the kinematic viscosity at 40° C. of the polyalkylene glycol is preferably 10 to 200 mm$^2$/s, more preferably 20 to 150 mm$^2$/s. If the kinematic viscosity at 40° C. is less than 10 mm$^2$/s, lubricity and hermeticity of a compressor tend to be deteriorated, and if the kinematic viscosity at 40° C. is more than 200 mm$^2$/s, the composition range where compatibility is exhibited to the refrigerant under a low temperature condition is narrow, and poor lubrication in a refrigeration compressor and inhibition of heat exchange in an evaporator tend to be easily caused.

The pour point of the polyalkylene glycol represented by the above formula (9) is preferably −10° C. or less, more preferably −20 to −50° C. If a polyalkylene glycol whose pour point is −10° C. or more is used, the refrigerating machine oil tends to be solidified in a refrigerant circulation system at a low temperature.

In the production step of the polyalkylene glycol represented by the above formula (9), an alkylene oxide such as propylene oxide may cause a side reaction to occur, to form an unsaturated group such as an aryl group in the molecule. If an unsaturated group is formed in the molecule of the polyalkylene glycol, a phenomenon such as deterioration in heat stability of the polyalkylene glycol by itself, production of sludge due to production of a polymerized product, or production of peroxide due to deterioration in antioxidative properties (oxidation resistance) easily occurs. In particular, peroxide, if produced, is decomposed to produce a compound having a carbonyl group, and furthermore the compound having a carbonyl group produces sludge to cause capillary clogging to easily occur.

Accordingly, the polyalkylene glycol in the present embodiment is preferably a polyalkylene glycol low in the degree of unsaturation due to an unsaturated group or the like. The degree of unsaturation of the polyalkylene glycol is preferably 0.04 meq/g or less, more preferably 0.03 meq/g or less, most preferably 0.02 meq/g or less. The peroxide value is preferably 10.0 meq/kg or less, more preferably 5.0 meq/kg or less, most preferably 1.0 meq/kg. The carbonyl value is preferably 100 ppm by weight or less, more preferably 50 ppm by weight or less, most preferably 20 ppm by weight or less.

In order to obtain a polyalkylene glycol low in the degree of unsaturation, the peroxide value and the carbonyl value, it is preferable that the reaction temperature in a reaction of propylene oxide be 120° C. or less (more preferably 110° C. or less). If an alkali catalyst may be used in production, an inorganic adsorbent such as activated carbon, activated white earth, bentonite, dolomite or aluminosilicate can be used in order to remove such a catalyst, to thereby reduce the degree of unsaturation. An increase in the peroxide value or the carbonyl value can also be prevented by avoiding contact with oxygen in production or use of the polyalkylene glycol as much as possible, or adding an antioxidant.

While the polyalkylene glycol is required to have a predetermined range of the carbon/oxygen molar ratio, the types and the mixing ratio of raw material monomers can be selected and modulated to thereby produce a polymer where the molar ratio is in the above range.

The base oil may also contain, in addition to the oxygen-containing oil, a hydrocarbon-based oil such as mineral oil, an olefin polymer, a naphthalene compound or alkylbenzene. The content of the oxygen-containing oil is preferably 5% by mass or more, more preferably 30% by mass or more, further preferably 95% by mass or more based on the total amount of the base oil.

The refrigerating machine oil may further contain various additives, if necessary. Examples of such additives include an acid scavenger, an antioxidant, an extreme-pressure agent, an oiliness agent, a defoaming agent, a metal inactivating agent, an antiwear agent, a viscosity index improver, a pour-point depressant, a detergent dispersant, a friction modifier and a corrosion inhibitor. The content of the additive is preferably 5% by mass or less, more preferably 2% by mass or less based on the total amount of the refrigerating machine oil.

It is preferable that the refrigerating machine oil further contain, among the above additives, an acid scavenger from the viewpoint of a more enhancement in thermal/chemical stability. Examples of the acid scavenger include an epoxy compound and a carbodiimide compound.

Examples of the epoxy compound include, but not particularly limited, a glycidyl ether type epoxy compound, a glycidyl ester type epoxy compound, an oxirane compound, an alkyloxirane compound, an alicyclic epoxy compound, epoxidized fatty acid monoesters and epoxidized vegetable oil. Such an epoxy compound can be used singly or in combinations of two or more.

Examples of the glycidyl ether type epoxy compound include n-butyl phenyl glycidyl ether, i-butyl phenyl glycidyl ether, sec-butyl phenyl glycidyl ether, tert-butyl phenyl glycidyl ether, pentyl phenyl glycidyl ether, hexyl phenyl glycidyl ether, heptyl phenyl glycidyl ether, octyl phenyl glycidyl ether, nonyl phenyl glycidyl ether, decyl phenyl glycidyl ether, decyl glycidyl ether, undecyl glycidyl ether, dodecyl glycidyl ether, tridecyl glycidyl ether, tetradecyl glycidyl ether, 2-ethylhexylglycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether and polyalkylene glycol diglycidyl ether.

Examples of the glycidyl ester type epoxy compound include glycidyl benzoate, glycidyl neodecanoate, glycidyl-2,2-dimethyloctanoate, glycidyl acrylate and glycidyl methacrylate.

The alicyclic epoxy compound refers to a compound having a partial structure where carbon atoms constituting an epoxy group directly constitute an alicyclic ring, represented by the following formula (10).

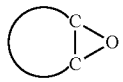

(10)

Examples of the alicyclic epoxy compound include 1,2-epoxycyclohexane, 1,2-epoxycyclopentane, 3',4'-epoxycyclohexylmethyl-3,4-epoxycyclohexanecarboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane and 4-epoxyethyl-1,2-epoxycyclohexane.

Examples of the allyloxirane compound include 1,2-epoxystyrene and alkyl-1,2-epoxystyrenes.

Examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyicosane.

Examples of the epoxidized fatty acid monoesters include esters of epoxidized fatty acids having 12 to 20 carbon atoms with alcohols having 1 to 8 carbon atoms, or phenols or alkylphenols. As the epoxidized fatty acid monoesters, butyl, hexyl, benzyl, cyclohexyl, methoxyethyl, octyl, phenyl and butyl phenyl esters of epoxystearic acid are preferably used.

Examples of the epoxidized vegetable oil include an epoxy compound of vegetable oil such as soybean oil, flaxseed oil and cottonseed oil.

As the carbodiimide compound, for example, dialkyl carbodiimides, diphenyl carbodiimides, and bis(alkylphenyl)carbodiimides can be used, but not particularly limited. Examples of the dialkyl carbodiimides include diisopropyl carbodiimide and dicyclohexyl carbodiimide. Examples of the bis(alkylphenyl)carbodiimides include ditolyl carbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide and bis(nonylphenyl)carbodiimide.

It is preferable that the refrigerating machine oil further contain, among the above additives, an antiwear agent. Examples of a suitable antiwear agent include phosphoric acid esters, thiophosphoric acid esters, a sulfide compound and zinc dialkyldithiophosphates. Among the phosphoric acid esters, triphenyl phosphate (TPP) and tricresyl phosphate (TCP) are preferable. Among the thiophosphoric acid esters, triphenyl phosphorothionate (TPPT) is preferable. While the sulfide compound includes various compounds, a monosulfide compound is preferable from the viewpoints that stability of the refrigerating machine oil is ensured and copper often used in the interior of refrigeration equipment can be inhibited from being modified.

It is preferable that the refrigerating machine oil further contain, among the above additives, an antioxidant. Examples of the antioxidant include a phenolic compound such as di-tert-butyl-p-cresol, and an amine-based compound such as alkyl diphenylamines. In particular, it is preferable that the refrigerating machine oil contain, as the antioxidant, 0.02 to 0.5% by mass of the phenolic compound based on the total amount of the refrigerating machine oil.

It is preferable that the refrigerating machine oil further contain, among the above additives, a friction modifier, an extreme-pressure agent, a corrosion inhibitor, a metal inactivating agent, and a defoaming agent. Examples of the friction modifier include aliphatic amines, aliphatic amides, aliphatic imides, alcohols, esters, phosphoric acid ester amine salts and phosphorous acid ester amine salts. Examples of the extreme-pressure agent include sulfurized olefins and sulfurized oil. Examples of the corrosion inhibitor include esters or partial esters of alkenylsuccinic acids. Examples of the metal inactivating agent include benzotriazole, and benzotriazole derivatives. Examples of the defoaming agent include a silicone compound and a polyester compound.

The content of the base oil in the refrigerating machine oil is preferably 80% by mass or more, more preferably 90% by mass or more, further preferably 95% by mass or more based on the total amount of the refrigerating machine oil in order that characteristics required for the refrigerating machine oil, such as lubricity, compatibility, thermal/chemical stability, and electrical insulation properties, are excellent.

The kinematic viscosity at 40° C. of the refrigerating machine oil may be preferably 3 to 1000 mm$^2$/s, more preferably 4 to 500 mm$^2$/s, most preferably 5 to 400 mm$^2$/s. The kinematic viscosity at 40° C. of the refrigerating machine oil may be preferably 3 mm$^2$/s or more, more preferably 4 mm$^2$/s or more, further preferably 5 mm$^2$/s or more, and may be preferably 1000 mm$^2$/s or less, more preferably 500 mm$^2$/s or less, further preferably 400 mm$^2$/s or less.

The kinematic viscosity at 100° C. of the refrigerating machine oil may be preferably 1 to 100 mm$^2$/s, more preferably 2 to 50 mm$^2$/s. The kinematic viscosity at 100° C. of the refrigerating machine oil may be preferably 1 mm$^2$/s or more, more preferably 2 mm$^2$/s or more, and may be preferably 100 mm$^2$/s or less, more preferably 50 mm$^2$/s or less.

The volume resistivity of refrigerating machine oil is not particularly limited, but may be preferably $1.0\times10^9$ Ω·m or more, more preferably $1.0\times10^{10}$ Ω·m or more, most preferably $1.0\times10^{11}$ Ω·m or more. In particular, in the case of use for a hermetic type refrigerating machine, high electrical insulation properties tends to be required. The volume resistivity in the present invention means the value measured at 25° C. according to JIS C2101:1999 "Electrical insulating oil test method".

The moisture content in the refrigerating machine oil is not particularly limited, but may be preferably 200 ppm or less, more preferably 100 ppm or less, most preferably 50 ppm or less based on the total amount of the refrigerating machine oil. In particular, in the case of use for a hermetic type refrigerating machine, the moisture content is demanded to be low from the viewpoints of thermal/chemical stability of the refrigerating machine oil and the influence on electrical insulation properties.

The acid value of the refrigerating machine oil is not particularly limited, but may be preferably 1.0 mgKOH/g or less, more preferably 0.1 mgKOH/g or less in order that a metal used in a refrigerating machine or a pipe is prevented from corroding, and that, in the case where the refrigerating machine oil contains an ester, the ester is prevented from being decomposed. The acid value in the present invention means the acid value measured according to JIS K2501: 2003 "Petroleum products and lubricant oils-neutralization test method".

The ash of the refrigerating machine oil is not particularly limited, but may be preferably 100 ppm or less, more preferably 50 ppm or less in order that thermal/chemical stability of the refrigerating machine oil according to the present embodiment is enhanced to suppress the occurrence of sludge and the like. The ash in the present invention means the value of the ash measured according to JIS K2272:1998 "Crude oils and petroleum products-ash and sulfated ash test method".

The pour point of the refrigerating machine oil may be preferably −10° C. or less, more preferably −20° C. or less, further preferably −30° C. or less. The pour point in the present invention means the pour point measured according to JIS K2269.

A composition comprising, as a base oil, the at least one oxygen-containing oil having a carbon/oxygen molar ratio of 2.5 or more and 5.8 or less, and a composition comprising, as a base oil, the at least one oxygen-containing oil having a carbon/oxygen molar ratio of 2.5 or more and 5.8 or less, and further comprising the various additives are suitably used as a constituent component of the refrigerating machine oil to be used with the refrigerant according to the present embodiment, or as a constituent component of the working fluid composition for a refrigerating machine comprising the refrigerating machine oil and the refrigerant according to the present embodiment.

The oxygen-containing oil having a carbon/oxygen molar ratio of 2.5 or more and 5.8 or less, and the various additives are suitably used for manufacturing the refrigerating machine oil to be used with the refrigerant according to the present embodiment, or the working fluid composition for a refrigerating machine comprising the refrigerating machine oil and the refrigerant according to the present embodiment.

The refrigerating machine oil according to the present embodiment is used with the refrigerant according to the present embodiment. In addition, the working fluid composition for a refrigerating machine according to the present embodiment comprises the refrigerant according to the present embodiment. In the refrigerant according to the present embodiment, the contents of respective refrigerants: difluoromethane (HFC-32), pentafluoroethane (HFC-125), 2,3,3,3-tetrafluoropropene (HFO-1234yf) and 1,1,1,2-tetrafluoroethane (HFC-134a); may be each 15% by mass or more, and may also be 20% by mass or more, based on the total amount of the refrigerant. The contents of such respective refrigerants may be each 35% by mass or less, and may also be 30% by mass or less. The contents of such respective refrigerants may be identical or different from each other.

The refrigerant according to the present embodiment may further contain, in addition to difluoromethane (HFC-32), pentafluoroethane (HFC-125), 2,3,3,3-tetrafluoropropene (HFO-1234yf) and 1,1,1,2-tetrafluoroethane (HFC-134a), a known refrigerant such as other saturated fluorohydrocarbon refrigerant and/or other unsaturated fluorohydrocarbon refrigerant.

Examples of other saturated fluorohydrocarbon refrigerant include 1,1,2,2-tetrafluoroethane (HFC-134), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365mfc).

Examples of other unsaturated fluorohydrocarbon refrigerant include 1,2,3,3,3-pentafluoropropene (HFO-1225ye), 1,3,3,3-tetrafluoropropene (HFO-1234ze), 1,2,3,3-tetrafluoropropene (HFO-1234ye) and 3,3,3-trifluoropropene (HFO-1243zf).

The content of the refrigerating machine oil in the working fluid composition for a refrigerating machine is not particularly limited, but may be preferably 1 to 500 parts by mass, more preferably 2 to 400 parts by mass relative to 100 parts by mass of the refrigerant.

The working fluid composition for a refrigerating machine according to the present embodiment is preferably used for a room-air conditioner and a cold storage chamber having a reciprocating or rotary hermetic type compressor, or an open type or hermetic type car air-conditioner. The working fluid composition for a refrigerating machine and the refrigerating machine oil, according to the present embodiment, are preferably used for cooling apparatuses in a dehumidifier, a water heater, a freezer, a refrigeration and cold storage warehouse, a vending machine, a showcase, a chemical plant, and the like. The working fluid composition for a refrigerating machine and the refrigerating machine oil, according to the present embodiment, are also preferably used for those having a centrifugal compressor.

EXAMPLES

Hereinafter, the present invention is more specifically described with reference to Examples, but the present invention is not limited to the following Examples.

Polyol esters of fatty acid with polyhydric alcohol, having respective compositions shown in Tables 1 and 2, as base oils 1 to 10, and the following polyvinyl ether were used. Abbreviations in the Tables represent the following compounds.
iC4: 2-methylpropanoic acid
nC5: n-pentanoic acid
iC8: 2-ethylhexanoic acid
iC9: 3,5,5-trimethylhexanoic acid
nC10: n-decanoic acid iC18: 2-ethylhexadecanoic acid
nC22: docosanoic acid
PET: pentaerythritol

TABLE 1

|  |  | Base oil 1 | Base oil 2 | Base oil 3 | Base oil 4 |
|---|---|---|---|---|---|
| Composition of fatty acid (% by mole) | iC4 | — | 35 | — | — |
|  | nC5 | — | — | 40 | — |
|  | iC8 | 50 | — | — | — |
|  | iC9 | 50 | 65 | 60 | — |
|  | nC10 | — | — | — | 100 |
|  | iC18 | — | — | — | — |
|  | nC22 | — | — | — | — |
| Polyhydricalcohol |  | PET | PET | PET | PET |

TABLE 2

|  |  | Base oil 5 | Base oil 6 | Base oil 7 | Base oil 8 |
|---|---|---|---|---|---|
| Composition of fatty acid (% by mole) | iC4 | — | — | 40 | — |
|  | nC5 | — | 80 | — | — |
|  | iC8 | 50 | — | — | — |
|  | iC9 | — | 20 | — | — |
|  | nC10 | — | — | — | — |
|  | iC18 | 50 | — | — | — |
|  | nC22 | — | — | 60 | 100 |
| Polyhydricalcohol |  | PET | PET | PET | PET |

Base oil 9: copolymer of ethyl vinyl ether and isobutyl vinyl ether (ethyl vinyl ether/isobutyl vinyl ether=7/1 (molar ratio), Mw: 910)
Base oil 10: polymer of ethyl vinyl ether (Mw: 890)

Base oils 1 to 10 and the following additives were used to prepare sample oils 1 to 14 having respective compositions shown in Tables 3 to 5.

Additive 1: glycidyl neodecanoate
Additive 2: 2-ethylhexyl glycidyl ether
Additive 3: tricresyl phosphate
Additive 4: 2,6-di-tert.-butyl-p-cresol The respective sample oils were subjected to the following stability test. The results are shown in Tables 3 to 5. Refrigerants R448A and R449A used in the stability test and a refrigerant compatibility test described later were refrigerants having the following respective compositions (contents were based on the total amount of each refrigerant).

R448A: HFC-32 (26% by mass), HFC-125 (26% by mass), HFO-1234yf (20% by mass), HFC-134a (21% by mass), HFO-1234ze (E) (7% by mass)

R449A: HFC-32 (24.3% by mass), HFC-125 (24.7% by mass), HFO-1234yf (25.3% by mass), HFC-134a (25.7% by mass)

(Stability Test)

The stability test was performed according to JIS K2211: 2009 (autoclave test). Specifically, 80 g of each sample oil where the moisture content was adjusted to 100 ppm was weighed and taken in an autoclave, a catalyst (iron, copper and aluminum wires each having an outer diameter of 1.6 mm and a length of 50 mm) and 20 g of R448A (refrigerant) were encapsulated therein, the resultant was heated to 140° C., and the acid value (JIS C2101:1999) of the sample oil after 160 hours was measured.

TABLE 3

|  |  | Sample oil 1 | Sample oil 2 | Sample oil 3 | Sample oil 4 | Sample oil 5 |
|---|---|---|---|---|---|---|
| Composition of sample oil (% by mass, based on total amount of sample oil) | Base oil 1 | 100 | — | — | — | — |
|  | Base oil 2 | — | 100 | — | — | — |
|  | Base oil 3 | — | — | 100 | — | — |
|  | Base oil 4 | — | — | — | 100 | — |
|  | Base oil 5 | — | — | — | — | 100 |
|  | Base oil 6 | — | — | — | — | — |
|  | Base oil 7 | — | — | — | — | — |
|  | Base oil 8 | — | — | — | — | — |
|  | Additive 1 | — | — | — | — | — |
|  | Additive 2 | — | — | — | — | — |
|  | Additive 3 | — | — | — | — | — |
|  | Additive 4 | — | — | — | — | — |
| Kinematic viscosity at 40° C. (mm²/s) |  | 68.0 | 68.0 | 51.0 | — | 79.0 |
| Kinematic viscosity at 100° C. (mm²/s) |  | 8.3 | 8.2 | 7.4 | — | 10.3 |
| Viscosity index |  | 89 | 86 | 106 | — | 113 |
| Stability, Acid value (mgKOH/g) |  | 0.11 | 0.13 | 0.32 | 0.24 | 0.31 |

TABLE 4

|  |  | Sample oil 6 | Sample oil 7 | Sample oil 8 | Sample oil 9 | Sample oil 10 |
|---|---|---|---|---|---|---|
| Composition of sample oil | Base oil 1 | — | 99.5 | — | — | — |
|  | Base oil 2 | — | — | — | — | — |

TABLE 4-continued

|  |  | Sample oil 6 | Sample oil 7 | Sample oil 8 | Sample oil 9 | Sample oil 10 |
|---|---|---|---|---|---|---|
| (% by mass, based on total amount of sample oil) | Base oil 3 | — | — | 99.4 | — | — |
|  | Base oil 4 | — | — | — | — | — |
|  | Base oil 5 | — | — | — | — | — |
|  | Base oil 6 | 100 | — | — | — | — |
|  | Base oil 7 | — | — | — | 100 | — |
|  | Base oil 8 | — | — | — | — | 100 |
|  | Additive 1 | — | 0.1 | 0.5 | — | — |
|  | Additive 2 | — | 0.1 | — | — | — |
|  | Additive 3 | — | 0.1 | — | — | — |
|  | Additive 4 | — | 0.2 | 0.1 | — | — |
| Kinematic viscosity at 40° C. (mm²/s) |  | 23.0 | 66.5 | 50.0 | — | — |
| Kinematic viscosity at 100° C. (mm²/s) |  | 4.6 | 8.2 | 7.3 | — | — |
| Viscosity index |  | 116 | 89 | 106 | — | — |
| Stability, Acid value (mgKOH/g) |  | 0.43 | 0.03 | 0.04 | 0.65 | 0.54 |

TABLE 5

|  |  | Sample oil 11 | Sample oil 12 | Sample oil 13 | Sample oil 14 |
|---|---|---|---|---|---|
| Composition of sample oil (% by mass, based on total amount of sample oil) | Base oil 9 | 100 | — | 98 | — |
|  | Base oil 10 | — | 100 | — | 98 |
|  | Additive 1 | — | — | — | — |
|  | Additive 2 | — | — | 0.5 | 0.5 |
|  | Additive 3 | — | — | 1 | 1 |
|  | Additive 4 | — | — | 0.5 | 0.5 |
| Kinematic viscosity at 40° C. (mm²/s) |  | 71.0 | 67.0 | 68.0 | 64.0 |
| Kinematic viscosity at 100° C. (mm²/s) |  | 8.4 | 8.2 | 8.2 | 8.0 |
| Viscosity index |  | 85 | 88 | 86 | 89 |
| Stability, Acid value (mgKOH/g) |  | 0.48 | 0.45 | 0.32 | 0.31 |

In addition, sample oils 1 to 14 were subjected to the following refrigerant compatibility test, and all the sample oils were thus confirmed to be compatible with refrigerants R448A and R449A.

(Refrigerant Compatibility Test)

According to JIS K2211:2009 "Test method of compatibility with refrigerant", 10 g of each sample oil was compounded with 10 g of R448A or R449A (refrigerant), and whether the refrigerant and the refrigerating machine oil were compatible with each other at 0° C. or not was observed.

The invention claimed is:

1. A working fluid composition for a refrigerating machine, comprising:
    a refrigerating machine oil comprising, as a base oil, at least one oxygen-containing oil having a carbon/oxygen molar ratio of 2.5 or more and 5.8 or less, wherein the oxygen-containing oil is an ester of a polyhydric alcohol and a fatty acid comprising 50 to 100% by mole of a branched fatty acid having 4 to 20 carbon atoms; and
    a refrigerant selected from the group consisting of
        a refrigerant comprising 15% by mass or more of difluoromethane, 24.7% by mass or more of pentafluoroethane, 15% by mass or more of 2,3,3,3-tetrafluoropropene and 20% by mass or more of 1,1,1,2-tetrafluoroethane based on a total amount of the refrigerant,
        a refrigerant comprising 15% by mass or more of difluoromethane, 20% by mass or more of pentafluoroethane, 15% by mass or more of 2,3,3,3-tetrafluoropropene and 21% by mass or more of 1,1,1,2-tetrafluoroethane based on a total amount of the refrigerant, and
        a refrigerant comprising 15% by mass or more of difluoromethane, 20% by mass or more of pentafluoroethane, 15% by mass or more of 2,3,3,3-tetrafluoropropene and 20% by mass or more of 1,1,1,2-tetrafluoroethane,
    based on a total amount of the refrigerant.

2. The working fluid composition for a refrigerating machine according to claim 1, comprising, as the oxygen-containing oil, an ester of a fatty acid and a polyhydric alcohol, wherein a ratio of a fatty acid having 4 to 20 carbon atoms in the fatty acid is 20 to 100% by mole.

3. The working fluid composition for a refrigerating machine according to claim 1, wherein the refrigerating machine oil further comprises
    at least one selected from the group consisting of an epoxy compound and a carbodiimide compound, and
    an antioxidant.

4. The working fluid composition for a refrigerating machine according to claim 3, wherein
    the epoxy compound is selected from the group consisting of
        a glycidyl ether type epoxy compound,
        a glycidyl ester type epoxy compound,
        an oxirane compound,
        an alkyloxirane compound,
        an alicyclic epoxy compound,
        an epoxidized fatty acid monoester and
        an epoxidized vegetable oil, and
    the carbodiimide compound is selected from the group consisting of
        a dialkyl carbodiimide,
        a diphenyl carbodiimide, and
        a bis(alkylphenyl)carbodiimide.

5. The working fluid composition for a refrigerating machine according to claim 3, wherein the antioxidant is selected from the group consisting of a phenolic compound and an amine-based compound.

6. The working fluid composition for a refrigerating machine according to claim 3, wherein the antioxidant is selected from the group consisting of di-tert-butyl-p-cresol and an alkyl diphenylamine.

7. The working fluid composition for a refrigerating machine according to claim 1, wherein the refrigerating machine oil has a pour point of −10° C. or less.

8. The working fluid composition for a refrigerating machine according to claim 1, wherein the refrigerant comprises 15% by mass or more of difluoromethane, 20% by mass or more of pentafluoroethane, 15% by mass or more of 2,3,3,3-tetrafluoropropene and 20% by mass or more of 1,1,1,2-tetrafluoroethane, based on a total amount of the refrigerant.

9. A working fluid composition for a refrigerating machine, comprising:
 a refrigerating machine oil comprising, as a base oil, at least one oxygen-containing oil having a carbon/oxygen molar ratio of 2.5 or more and 5.8 or less; and
 a refrigerant comprising 15% by mass or more of difluoromethane, 15% by mass or more of pentafluoroethane, 15% by mass or more of 2,3,3,3-tetrafluoropropene and 15% by mass or more of 1,1,1,2-tetrafluoroethane based on a total amount of the refrigerant, and further comprising 1,3,3,3-tetrafluoropropene.

* * * * *